UNITED STATES PATENT OFFICE.

JEAN BAPTISTE DAVID CASSINELLI, OF PARIS, FRANCE.

IMPROVEMENT IN COMBUSTIBLE COMPOUNDS.

Specification forming part of Letters Patent No. 186,294, dated January 16, 1877; application filed September 8, 1876.

*To all whom it may concern:*

Be it known that I, JEAN BAPTISTE DAVID CASSINELLI, of Paris, in the Republic of France, have invented a new and Improved Combustible Compound, which invention is fully set forth in the following specification:

This invention consists in a compound prepared from pulverized tan or bark of trees, charcoal-dust, nitrate of lead dissolved in water, and starch, which is boiled in water, the whole being mixed, and then pressed, molded, or otherwise formed in cakes or lumps of convenient size for use.

The ingredients which I use in my composition are mixed together in about the following proportions: Pulverized tan or bark, one pound; charcoal-dust, one pound; nitrate of lead, two ounces; starch, three ounces. The nitrate of lead is dissolved in hot water, the solution being left to cool previous to mixing it with the remaining ingredients, and the starch is boiled in a sufficient quantity of water to form a thin paste, which forms the cement for combining the remaining ingredients. If desired, however, other adhesive materials may be substituted for the starch—such as paste of flour, or a solution of gum-arabic. After this has been accomplished, all the ingredients are carefully mixed to form a homogeneous plastic mass, which is then molded or otherwise formed into cakes or lumps of convenient size for use. These cakes or lumps are finally dried, either by artificial heat or in the open air. When dry the cakes or lumps can be readily lighted by means of a match or candle, and they burn without smell or smoke; and, furthermore, one cake of my compound of about one pound weight lasts for sixteen or eighteen hours.

My compound is intended particularly for foot-stoves; but it can also be used with great advantage for heating sad-irons constructed for this purpose, or for heating small cooking apparatuses, or in all cases where it is essential to avoid smoke or bad odors.

What I claim as new, and desire to secure by Letters Patent, is—

A combustible compound consisting of tan-bark, charcoal, and nitrate of lead, in the proportions described, cemented together by means of starch-paste, and formed into cakes, substantially as and for the purposes set forth.

In testimony that I claim the foregoing I have hereunto set my hand and seal this 17th day of August, 1876.

JEAN BAPTISTE DAVID CASSINELLI. [L. S.]

Witnesses:
F. GIARDANO,
DOROZ.